Dec. 25, 1951    G. KEINATH    2,579,831
STORING AND REPRODUCING MEASURED QUANTITIES
Filed Sept. 6, 1946    4 Sheets-Sheet 1

*INVENTOR.*
George Keinath.
BY
*ATTORNEY*

Dec. 25, 1951    G. KEINATH    2,579,831
STORING AND REPRODUCING MEASURED QUANTITIES
Filed Sept. 6, 1946    4 Sheets-Sheet 2
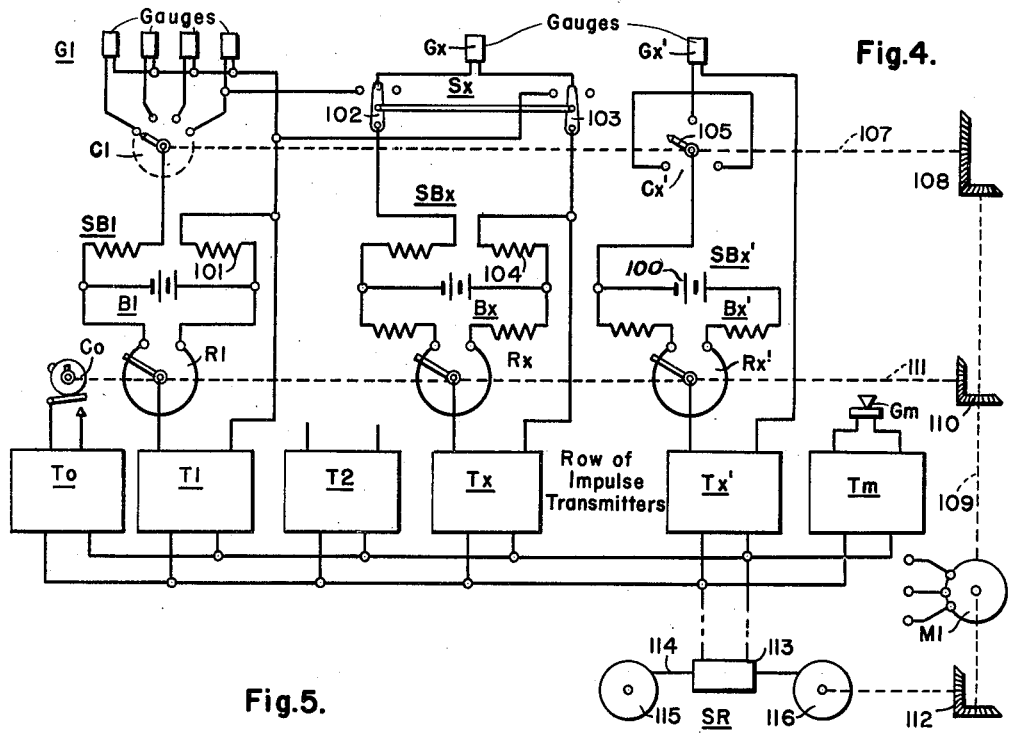
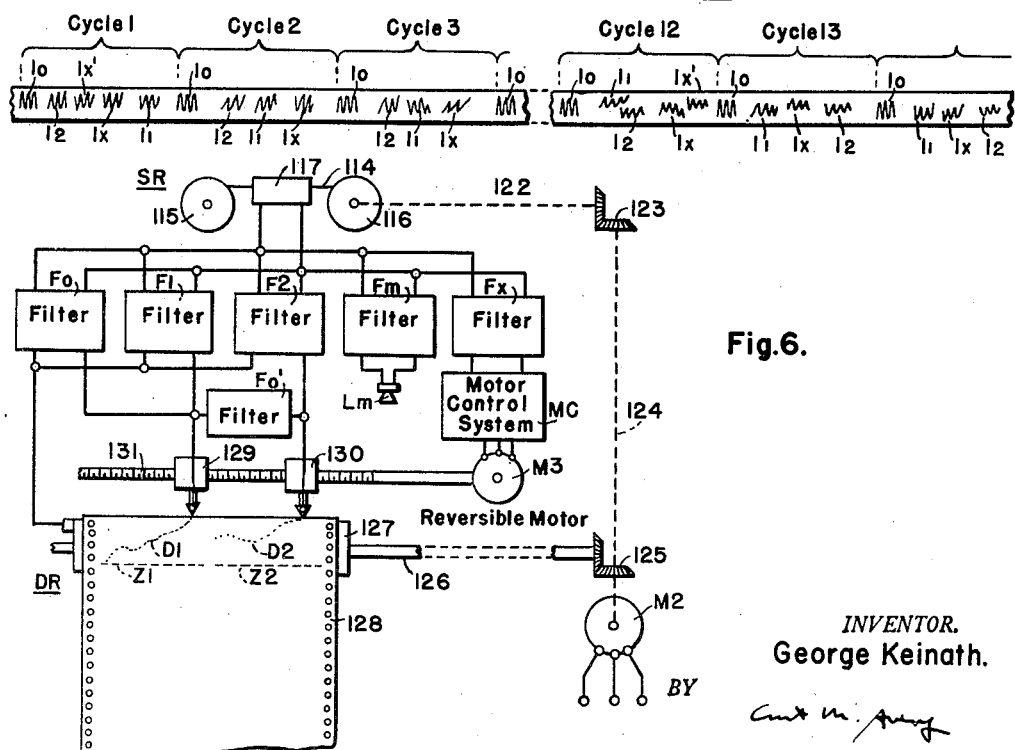
*INVENTOR.*
George Keinath.
BY
*ATTORNEY*

Dec. 25, 1951     G. KEINATH     2,579,831
STORING AND REPRODUCING MEASURED QUANTITIES
Filed Sept. 6, 1946     4 Sheets-Sheet 3

INVENTOR.
George Keinath.
ATTORNEY

Dec. 25, 1951  G. KEINATH  2,579,831
STORING AND REPRODUCING MEASURED QUANTITIES
Filed Sept. 6, 1946  4 Sheets-Sheet 4

INVENTOR.
George Keinath.
BY
ATTORNEY

Patented Dec. 25, 1951

2,579,831

UNITED STATES PATENT OFFICE 2,579,831

STORING AND REPRODUCING MEASURED QUANTITIES

George Keinath, Larchmont, N. Y.

Application September 6, 1946, Serial No. 695,316

18 Claims. (Cl. 346—33)

My invention relates to apparatus for measuring, storing, and reproducing a large number of data, for instance the quantities measured or responded to by measuring, testing, supervisory or control equipment.

It is an object of the invention to devise apparatus that is especially suitable for storing reproduceable signals representing quantities which occur in very large numbers, or within very short periods of time, or in a very fast succession, so that an immediate observation and evaluation of these quantities is either infeasible or unnecessary; and it is also an object to devise these apparatus in such a manner that the means for storing the signals, while permitting the preservation and accurate reproduction of large numbers of data, are of very small dimensions or weight.

Some examples of intended application may be given for elucidating the just-mentioned objects.

During test flights of airplanes, a large number of test data have to be recorded, such as the temperature at various locations of the propulsion plant, the stresses occurring at various places of the airplane structure, the engine speed, the torque at various locations of the engine shaft and other revolving parts, the altitude and other conditions of flight, movements of flight control surfaces, pressures, and so on. It is virtually impossible to have these data read off and recorded by personnel because only a few quantities can thus be observed and also because the weight of an additional crew is often prohibitive. Devices have, therefore, been designed which radio-transmit the measured quantities from the airplane to a ground station where the electric recording devices are located.

My invention, with reference to measurements and tests on airplanes, aims to provide a system that can be applied to advantage for very many measuring points and data or for fast sequential operations, or both; and that permits by relatively single means a storing and reproducing of the measured quantities. In the case of storing devices to be carried on the airplane, my invention aims further at permitting a reduction in the size or weight of the necessary storing means for a given number of measuring points or series of data; or, conversely, at permitting an increase in the number of stored data at a given size or weight of the devices to be carried on the plane.

Another example of a field of application in which the invention may be used to advantage is that of supervising manufacturing plants and processes. Such a supervision involves often the taking of very many testing, gauging and other measuring data such as the values of pressure, temperature, current, voltage etc., especially when continuously operating gauging devices for statistical purposes are to be employed; and it is within the above-stated objects of the invention to provide measuring, storing and reproducing systems which, though requiring relatively little space, afford the storing of a large number of data that can readily be reproduced or are readily available for a subsequent study of a selected series of data appertaining, for instance, to the performance of a single selected machine or plant unit. The significance of highly condensed yet readily analyzable records of numerous data will be appreciated if one considers, for instance, that an evaluation of such records may be needed only after the occurrence of a disturbance. Although hours or days may pass without such an occurrence, hundreds of charts are needlessly traced by the conventional supervisory devices, while the invention aims at eliminating such wasteful performance without affecting the availability, and possibility of subsequent reproduction, of all measured data.

In the known devices for recording a multitude of data, such as for the supervision of conditions measured on airplanes, the measured quantities, when reproduced on a strip chart appear as functions of time, such as pressure versus time or temperature versus time. It is often necessary to study one or several of the recorded quantities as to their relation to a variable quantity other than time, for instance, pressure versus speed, torque versus speed, or temperature versus altitude (X—Y relations). When using the above-mentioned known storing and reproducing devices, mathematic or graphic methods have to be applied by the persons analyzing several records of X and Y versus time in order to obtain the desired X—Y relations from the recorded curves. In contrast thereto, it is another object of my invention to provide storing and reproducing apparatus of the type above referred to that not only produce quantity-versus-time diagrams but are also capable of producing X—Y diagrams, or that automatically translate two available series of quantity-versus-time data into a directly readable X—Y diagram, thus simplifying the analysis and evaluation of the stored data and reducing the time needed therefor while avoiding the possibility of errors due to the human element heretofore involved.

In order to achieve these objects, and with a view toward the more specific objects and advantages apparent from the descriptions given below, my invention requires the provision of measuring and transmitting systems of the "sweep balance" type. Such a system measures the various magnitudes sequentially by means of a relay circuit whose impedance or voltage conditions are cyclically varied and whose relay issues an electric impulse at a singular moment within each cycle period so that the phase position of that moment relative to the period is indicative of the magnitude then measured. "Sweep balance" systems of this type are known as such from my Patents 2,306,392, 2,231,605 and 2,387,760, and also disclosed in the article "The Keinath Recorder" published in "Instruments," pages 200 to 210 of No. 4, for the month of April 1946. As far as is necessary for a complete understanding of the present invention, however, examples of such systems will be described in detail hereinafter.

In accordance with the present invention, such a sweep balance system is combined with one or more other systems which may also consist of sweep balance devices, and it is essential that these systems issue relay-controlled impulses, individually of short duration, that are distinguished from one another by different respective characteristics indicative of the respective systems or the groups of quantities measured by these respective systems. If only two measuring and impulse-issuing systems are provided, the characteristics may be distinguished from each other by different (positive and negative) polarity of a direct-current impulse. Preferably, and especially if more than two ssytems are to be combined, the impulses consist of short trains of waves and are distinguished from one another by different respective frequency characteristics, so that the impulses from different sweep balance systems are separable by electric filter means. These impulses of different characteristics are applied to an electrically operating storing device and recorded on a common carrier such as a recording disc, a photo-electrically exposed film of sound film type, or a magnetic wire or tape as also known for sound recording. When the measuring systems, or one of them, pass through a predetermined state of impedance or voltage conditions, another impulse (reference, zero, or start-stop impulse) is issued and recorded on the same disc, film, wire, tape or other record carrier of the storing device. Referring to the preferred use of frequency-distinguished impulses, this reference impulse consists also of a train of oscillations whose frequency ($f0$), is different from that of the above-mentioned measuring impulses ($f1, f2, f3, fx$, etc.). The distance on the carrier, of the impulse having the reference frequency ($f0$) from the respective impulses of the frequencies ($f2, f3$, etc.) is then a measure of the different data or quantities responded to by the condition-responsive respective gauges of the systems.

For reproducing the measuring data from the stored oscillatory recordings, I provide pick-up means along which the record carrier is passed. The pick-up means generate a series of recurring impulses whose respective frequencies or frequency bands correspond to the reference frequency ($f0$) and the measuring frequencies ($f1, f2, f3$, etc.) respectively. These impulses are passed through electric filters to a plurality of chart-type diagram recorder units so that each unit, due to the performance of the filters, is controlled by only one of the different measuring frequencies ($f1, f2, f3$, etc.) respectively, while the reference frequency ($f0$) serves for marking a reference or zero position on the chart in each coordinate diagram produced by the recording unit.

In systems according to the invention as set forth above, the record carrier of the storing device is preferably driven at constant speed both when storing and when reproducing the series of impulses. The sweep balance systems that supply the impulses to be stored are preferably also operated at a given constant speed during each consecutive period of performance. For producing magnitude-versus-time diagrams in the reproducing system, the chart and the stylus of the chart-type recorder are caused to also advance in proportion to time, for instance by driving them from a constant speed drive properly synchronized with the drive of the carrier (disc, film, wire or tape) of the storing device then in reproducing operation, or by means of a start-stop drive that may be controlled by the above-mentioned reference or zero impulses ($f0$).

According to another feature of the invention, however, one of the two coordinate movements between chart and stylus of the diagram recorder in the reproducing system is positioned under control by one of the recurrent measuring impulses so that the relative position between chart and stylus in the direction of that movement varies substantially in accordance with the timely or special distance of that one measuring impulse from the reference impulse. Since in such a system the mark-producing performance is controlled by one or several other measuring impulses, the resulting diagram represents directly an X—Y record, neither coordinate of which need be proportional to time.

These features will be more fully understood, and other features will be apparent, from the embodiments of the invention illustrated in the drawing in which:

Fig. 4 illustrates diagrammatically another embodiment of a measuring and storing apparatus which is especially designed for the reproduction of the stored quantities either as quantity-versus-time diagrams or in the form of X—Y diagrams depending upon the operating features of the reproducing devices;

Fig. 5 represents a magnetic tape with a schematic showing of stored oscillatory impulses as obtainable with a system according to Fig. 4;

Fig. 6 is a diagram of a reproducing apparatus for obtaining X—Y diagrams from a magnetic tape impressed by impulses in a system as shown in Fig. 4;

Figure 1:
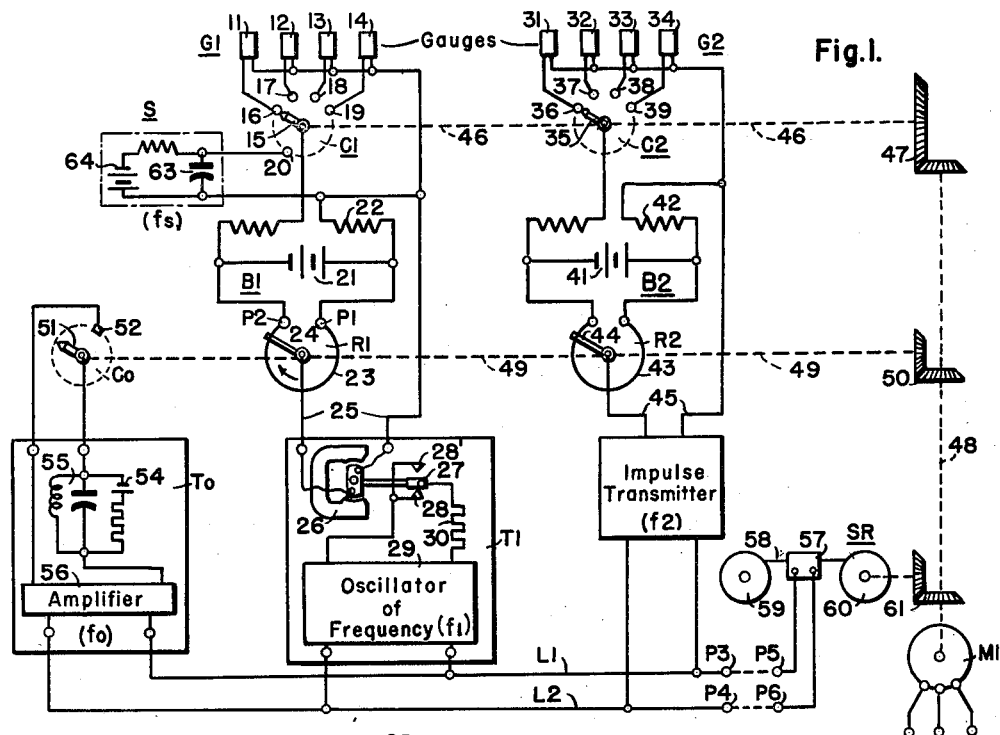
Figure 1 shows diagrammatically a measuring and storing apparatus having a multiple sweep balance system with an impulse storing device of the magnetic-tape recorder type.

The magnitude-measuring and impulse-storing apparatus illustrated in Fig. 1 is provided with a plurality of groups of gauges, such as the groups denoted as a whole by G1 and G2. These gauges consist of electric devices which are capable of translating the changes of a phenomenon or quantity under observation into corresponding variations of an electric magnitude such as impedance, voltage, or current. The gauge groups are connected to respective selector switches, such as those denoted by C1 and C2. These switches connect the gauges of each group sequentially into a measuring circuit B1 or B2, which includes a rheostat R1, R2, or the like control device capable of changing the resistance, voltage or other electrical conditions of the circuit over a given range of change. The output leads of the measuring circuits B1, B2 are connected to the input terminals of respective impulse transmitters T1 and T2. These transmitters are so designed that they issue an impulse of a distinctive frequency characteristic whenever the circuit control device R1 or R2 passes through a position or condition in which the appertaining measuring circuit assumes a predetermined condition, for instance, in which the circuit is balanced. The impulse transmitters are connected to a recording device SR which is generally of the sound-recording type, that is, whose record carrier is, for instance, a disc, a light-sensitive ribbon or film such as used for sound film, or a magnetic wire or tape recorder, the latter type being illustrated in the drawing. It should be understood, however, that the frequency characteristics of the impulses issued by the transmitters need not necessarily be limited to the audible range and that any kind of impulse storing device may be used in which the records are oscillatory, or generally of the impulse type, rather than immediately perceptible coordinate diagrams.

More in detail, the group of gauges denoted by G1 comprises a number of individual gauge elements of which only four are illustrated in Fig. 1 and denoted by 11, 12, 13 and 14, respectively. These gauges may either be all of the same kind, or they may be different as to their design or function. For the purpose of illustration, it is assumed that the gauges are of the kind in which an electric impedance, such as a resistance value, is changed in response to the phenomenon under observation. That is, the illustrated gauges may consist of resistance thermometers, torque measuring resistance gauges, or stress-responsive devices in which an impedance or resistance change is indicative of the force or stress to be measured. Voltage controlling or generating gauges may, of course, also be used, provided the appertaining measuring circuit is designed accordingly. For instance, a potentiometer type circuit (see circuit Bx' in Fig. 4) can be used if the gauges are to consist of voltage generating devices, such as thermocouples or tachometer generators.

The selector switch C1 has a rotatable contact member 15 which engages successively a number of bank contacts. The bank contacts 16, 17, 18 and 19 are connected with one lead of each gauge 11, 12, 13 and 14, respectively. In the illustrated position of the movable contact member 15, the gauge 11 is connected in the measuring circuit B1. As the contact 15 advances, the other gauges are sequentially substituted for the gauge 11 in the circuit B1.

The measuring circuit B1, as here illustrated, is of the Wheatstone bridge type. It includes a current source 21 or other circuit means for applying a substantially constant direct-current voltage to the input diagonal of the bridge. The one gauge included in the bridge at a time lies in one of the bridge branches in opposing relation to a reference or standard impedance 22. The two remaining branches of the bridge circuit are formed by the resistor 23 of the rheostatic control device R1. The slide contact 24 of this device is shown to be rotatable. This slide contact, as it moves from the starting point P1 to the end point P2 of its rotary travel, changes the resistance or voltage ratio of the two branches formed by resistor 23.

The output diagonal 25 of the bridge circuit B1, which extends between the slide contact 24 and the common lead of the gauges 11, 12, 13 and 14, is connected to a relay 26 which forms an intermediate member between the measuring circuit and the impulse transmitter T1 proper.

The relay 26, by way of example, is shown to be of the moving coil type. When the slide contact 24 begins its travel at point P1, the bridge circuit B1 is unbalanced so that a relatively high voltage of a given polarity is effective across the zero diagonal 25 and hence across the moving coil of relay 26. Under these initial conditions, the movable contact 27 of relay 26 is in engagement with a stationary contact 28. When the slide contact 24, during its rotary travel, passes through the singular point of resistor 23 at which the bridge circuit B1 is balanced, the declining voltage across the relay 26 passes through the zero value and immediately thereafter increases with reversed polarity. As a result, the relay contact 27 switches over to a stationary contact 28'.

The relay contacts 27, 28 and 28' are connected to an oscillator 29 which, when operative, issues a short-lasting oscillatory train of waves of an adjusted frequency F1. The oscillator 29 may be of any suitable type; for instance, it may consist of an electromechanically driven microphone type oscillator, an electronic oscillation generator, or a tuned capacitance-inductance circuit in conjunction with an electronic amplifier. These various types of oscillation generating devices are well known as such and hence here not illustrated in detail. However, the illustrated example is assumed to include a circuit which when open causes the oscillator 29 to transmit oscillations and when closed or short-circuited prevents the issuance of the oscillations. Hence, as long as the relay contact 27 engages either contact 28 or 28', the oscillator circuit is shorted through a resistor 30 so that no oscillations are transmitted. When the relay contact 27 moves from contact 28 to contact 28', the short-circuit is temporarily interrupted so that the oscillator 29 issues its tuned oscillations only during the interval of travel from one to the other stationary contact. The length of this interval can be adjusted by displacing the stationary contacts, or one of them, so that a desired limited number of current waves is transmitted to the impulse storing device SR.

The other sweep balance and impulse transmitter systems of the apparatus shown in Fig. 1 are designed and operative in a similar way. Thus, the four illustrated gauges 31, 32, 33 and 34 of gauge group G2 are connected to the respective bank contacts 36, 37, 38 and 39 of the selector switch C2, whose movable contact member 35 is connected to the bridge circuit B2. This circuit has a source 41 of constant voltage, which is preferably identical with the source 21 of bridge B1, and is also equipped with a standard or reference impedance 42. The rheostatic control device R2 appertaining to the bridge circuit B2 has a resistor 43 contacted by a slider 44 which forms part of the output or zero diagonal 45 connected to the input terminals of the impulse transmitter T2. This transmitter may include a relay similar to relay 26 and has also an oscillation generator which, however, is so tuned that the frequency (f2) of the issued impulses is sufficiently different from the frequency (f1) of the impulses issued by transmitter T1 to permit a subsequent separation by electric filters.

Before describing further details of the apparatus according to Fig. 1, I wish to call attention to the fact that the particular relay and impulse transmitting means shown in Fig. 1 have been chosen for illustration mainly because they permit a simple and easily understandable representation in the drawing. It is, for instance, for many purposes preferable to use relay and transmitting means of completely electronic type.

When referring to "sweep balance" systems, I have in mind not only measuring circuits of the bridge or potentiometer type in which the relay responds to an electric balance within the circuit proper, but intend to include measuring relay circuits in which the balance condition responded to by the relay is of mechanical or electromechanical nature and occurs in the relay rather than in the measuring circuit proper. These various sweep balance systems are known as such, for instance, from my above-mentioned patents.

Reverting to Fig. 1, it will be recognized that the selector switches C1, C2, and any other selector switches (not illustrated) appertaining to as many additional groups of gauges as may be present, are mounted on a common shaft 46 which is driven through a reduction gear 47 from the shaft 48 of a motor M1. This motor operates at substantially constant speed. The slide contacts 24, 44, as well as the slide contacts of any additional systems, are likewise mounted on a common shaft 49 which is driven through a gear 50 from the motor shaft 48. Thus, the selector switches are synchronized relative to one another and operate in a fixed time or speed relation to the likewise mutually synchronized slide contacts of the circuit control devices R1 and R2. The relation is such that the control devices will perform a full cycle of impedance or voltage variation during each period in which the selector contacts 15 and 35 are in engagement with one of the bank contacts of switches C1 and C2 respectively. The switch contacts 15 and 35 are so adjusted, or if desired stepwise driven, that they switch over from one to the adjacent bank contact in the dead interval elapsing while the rheostatic slide contact 24, for instance, passes from the end point P2 of its travel to the starting point P1 of the next cycle. Consequently, during the interval in which each individual gauge is connected to the appertaining measuring circuit, the rheostatic circuit control device passes once through a complete cycle of impedance or voltage variation.

Connected to the shaft 49 of the rheostat sliders is the movable contact 51 of another switch C0 which serves to control an impulse transmitter T0 for issuing a reference or zero impulse. The movable contact 51 in switch C0 engages temporarily a stationary contact 52 in a predetermined phase position of the rheostat sliders, preferably at the moment when these sliders start a cycle of travel at point P1. Connected to switch C0 is an oscillation generator 55 here shown to consist of a capacitor in resonance connection with an inductance coil. This resonance circuit is charged by a direct-current source 54 which may again be identical with those denoted by 21 and 41. In the moment of contact, an oscillatory discharge passes from the tuned circuit 55 to an amplifier 56 which issues a reference impulse to be also recorded by the storing device SR. The frequency (f0) of the reference or zero impulse is different from the frequency (f1, f2, etc.) of the measuring impulses issued by the other transmitters.

The impulse transmitters T0, T1, T2, etc. have their output terminals connected in parallel to common leads L1 and L2. These leads are attached to the recording head 57 of the oscillation recorder SR whose record carrier (wire or tape) 58 passes from a supply reel 59 onto a takeup reel 60 at a substantially constant speed derived from the drive shaft 48 by a suitable transmission 61.

Since the carrier travels equal distances during the recurring operating cycles of the rheostats R1, R2, the reference or zero impulses of the frequency (f0) stored on the carrier 58 are equally spaced from one another, while within each interval the measuring impulses of the frequencies f1, f2, etc. have respectively different distances from the reference impulse. These variable distances are dependent upon the quantities responded to by the gauges and are a measure of these respective quantities.

In order to facilitate a subsequent identification of the recorded impulses, a signal transmitter S may be associated with one of the selector switches. As illustrated, the signal transmitter S is attached to a bank contact 20 of switch C1 and includes a capacitor 63 which is kept charged from a current source 64 and discharges itself once during each operating sequence of the selector switches at a moment of fixed phase relation to that sequence. Hence, after the completion of a sequence, a synchronizing impulse of the frequency f1 is issued which for instance has a higher intensity than the measuring impulses of the same frequency. This synchronizing impulse occurs in regular intervals and denotes the beginning of a new series of measurements. If desired, of course, the synchronizing signal may be passed through a separate impulse transmitter so as to be distinguished by its frequency (fs) from all other impulses.

If the storing apparatus SR is to be located remote from the impulse transmitters, suitable transmission means, for instance radio transmitter and receiver sets, may be inserted between points P3, P4 on the one hand and P5, P6 on the other hand. For instance, the multiple sweep-balance devices and a radio transmitter may be located on an airplane, while a radio receiver and the storing apparatus SR are arranged in a ground station.

Figure 2:
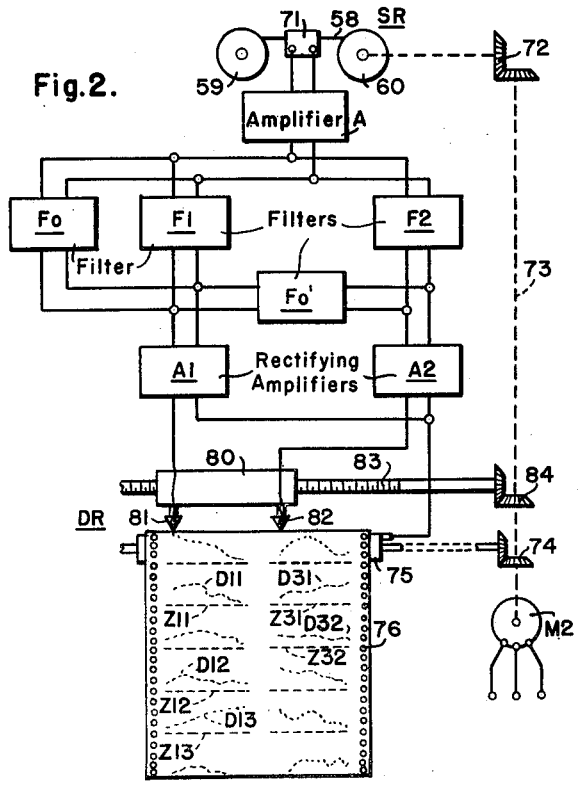
Fig. 2 shows a reproducing system for obtaining from an impulse storing tape as used in the system of Fig. 1 a chart record which represents the measured quantities versus time in the form of coordinate diagrams, the appertaining recorder proper being shown in front view.

The method and means for reproducing the impulses, stored on a record carrier in apparatus according to Fig. 1, are exemplified, in principle, by the apparatus illustrated in Fig. 2. After rewinding the magnetic tape 58 onto the storage reel 59, it is again passed onto the takeup reel 60 while it travels along a reproducing head or pickup 71. The recording device SR is driven through a transmission 72 from the shaft 73 of a motor M2. Shaft 73 drives also, through a transmission 74, the transport drum 75 for the endless strip chart 76 of a diagram recorder DR.

Figure 3:
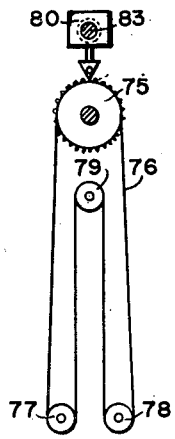
Fig. 3 represents a side view of the strip-chart recorder of Fig. 2.

In order to accommodate a sufficient length of strip chart within limited space, the strip may be folded and guided by rollers 77, 78 and 79 in the manner exemplified by Fig. 3. The strip is preferably perforated to engage sprocket teeth of the transport drum 75 so that a fixed phase position of the strip chart 76 relative to the drum 75 is maintained.

The diagram recorder DR illustrated in Fig. 2 incorporates two multiple recording units, that is, it has a stylus assembly 80 equipped with two styli 81 and 82 that are insulated from each other and capable of independently marking two respective diagram frames of the chart. The stylus assembly 80 is in threaded engagement with a feed screw 83 driven by a transmission 84 from the above-mentioned shaft 73.

The paper of chart 76, in the exemplified embodiment, is of the electro-responsive type. That is, a mark is produced by sparking, electrolytic or other electric effects at the point of a stylus electrode when an electric current or voltage is applied between the stylus electrode and a backing electrode, the latter consisting of the transport drum 75 or of a metal foil or metallization on the back of the chart paper. A dry paper material well suitable for the illustrated diagram recorder is available on the market under the trade name "Teledeltos" paper. However, electrolytic recorder papers to be used in moistened, or locally moistened, condition may also be used to advantage, especially if colored diagram records or multi-color records are desired.

The two electric marking circuits of the styli 81 and 82 according to Fig. 2 are connected to the pick-up 71 through an alternating-current amplifier A, electric filters F0, F1, F2, F0', and two rectifiers or rectifying amplifiers A1 and A2. The circuits of filters F0, F1 and F2 are permeable to frequencies or bands corresponding to the above-mentioned frequencies $f0$, $f1$ and $f2$ respectively of the oscillatory impulses stored on the carrier 58. The filter F0' blocks the passage of frequencies or bands corresponding to $f1$ and $f2$ but is permeable to the frequency $f0$.

During the operation of the system, if the motor M2 drives the tape 58 at the same speed at which the impulse recordings were stored, the pick-up 71 will issue electric oscillatory impulses of the original frequencies $f0$, $f1$ and $f2$ respectively. The rectified reference impulses of the frequency $f0$ pass through the filters F0 and F0' to both styli 81 and 82. The impulses of the frequency $f1$ impose corresponding rectified impulses only on the stylus 81; and the impulses of the frequency $f2$ are effective only on the stylus 82. The tape 58, however, can be driven at a speed different, preferably lower, than that used for storing. Then, the frequencies of the impulses issued by the pick-up 71 retain their respective proportional values although they are different from those of the original oscillatory impulses, and the filters F0, F1, F2 and F0' must be tuned to the corresponding frequency values then effective. The motor M2 in Fig. 2 is assumed to be a constant speed motor, for instance a synchronous alternating-current motor, although it should be understood that a start-stop motor, for instance, controlled by the reference or zero impulses from filter F0, may instead be employed in analogy to known start-stop drives for telegraphy or picture transmission.

With motor M2 operating at constant speed, the transport drum 75 moves the strip chart 76 at constant speed and the stylus assembly travels along the drum also at constant speed. The speeds of travel of the recording tape 58 and the strip chart 76 are correlated so that the chart completes one full turn of travel for each complete sequence of impulse cycles. That is, when the tape 58 travels a distance corresponding to one full revolution of the selector switches C1, C2 in Fig. 1 and hence has passed along the pick-up during as many individual sweep balance cycles as there are bank contacts in these selector switches, the endless chart 76 has just completed one full turn of motion. As a result, the two styli 81 and 82 mark on the chart as many diagrams as there are gauges in each gauge group of the measuring and storing apparatus (Fig. 1). Each diagram is composed of a reference or zero line ($Z11$, $Z12$, $Z31$, $Z32$ etc. in Fig. 2) marked by the reference impulses ($f0$), and a curve marked on the measuring impulses ($f1$, $f2$). For instance, the diagram curves $D11$, $D12$, $D13$ may correspond to the quantities responded to by the gauges 11, 12, 13 (Fig. 1) respectively; and the curves $D31$, $D32$ (Fig. 2) are indicative of the respective quantities measured by gauges 31, 32 (Fig. 1). The abscissa of each diagram represents time. The ordinate values, measured between the zero line such as $Z11$, and the appertaining point of the curve, such as $D11$ represent the measured quantities.

It will be recognized that the two strip or frame areas of chart 76 and the appertaining styli and drum portions represent two separate, though synchronized, recording units. Hence, if desired, two separate diagram recorders, each having an endless strip chart and a stylus may be used instead. If more than two gauge groups, i. e. more than two impulse series of different frequency characteristics are required, a corresponding multiple strip-chart recorder or any appropriate combination of single or multiple strip-chart recorders may be employed. There is also the possibility, within the invention, of applying single-diagram recorders, i. e. recording units with only a single coordinate system on the record chart. Such single-diagram recorders are applicable if one or several of the gauge groups of the measuring and recording apparatus contain only a single gauge such as the gauges GX or GX' referred to hereinafter with reference to Fig. 4. Single-diagram recorders, however, are also applicable for groups of several gauges, provided the reproducing apparatus is equipped with a selector switch (similar to switch C1 or C2 in Fig. 1) which connects a plurality of individual recorders sequentially with the appertaining filter. Another possibility of reproducing the stored impulses in the form of diagram consists in the use of multi-color recorders as disclosed in my copending application Serial No. 606,053, now abandoned. Such recorders have a plurality of separately controllable styli operating on the same coordinate system of the chart but producing diagram curves of respectively different colors. In view of the fact that these other modifications of diagram recorders are either known as such, or are disclosed in the last-mentioned application, they are here not illustrated or further described.

Regardless of the particular diagram recorders used in reproducing apparatus according to Fig. 2, the resulting diagrams are all quantity-versus-time recorders. As pointed out above, however, the invention affords also a reproduction of the stored oscillatory impulses in such a manner that the ultimate diagram records represent one measured quantity, or a group of such quantities, as a function of another variable quantity not necessarily proportional to time (X—Y records). The measuring and storing apparatus, for obtaining such X—Y records, need not be different from the one shown in Fig. 1. For the purpose of more convenient explanation and in order to disclose other features of the invention, however, a more elaborate measuring and impulse-storing apparatus, especially suitable for X—Y recording, is illustrated in Fig. 4.

The apparatus shown in Fig. 4 in its basic aspects is similar to that of Fig. 1. That is, the apparatus of Fig. 4 has a sweep balance system SB1 which has a group of gauges G1, a selector switch C1, a measuring circuit B1 with a reference or standard impedance 101, and a potentiometric rheostat R1 connected to an impulse transmitter T1 which issues oscillatory impulses of a given frequency characteristic (*f*1) to an oscillation-recording storing device SR. This system is designed and operative similar to the sweep balance system appertaining to transmitter T1 in Fig. 1. Fig. 4 shows another transmitter T2 for the frequency *f*2 to which a corresponding sweep balance system (not shown) is connected. A switch Co on the slider shaft of the rheostat R1 serves to control the issuance of a reference or zero impulse (*f*0) by a transmitter T0.

As far as described the measuring and impulse storing apparatus, according to Fig. 4, is similar to the one already described. However, the apparatus shown in Fig. 4 is also equipped with two sweep balance systems SB*x* and SB*x*' which are designed and operative in a different manner.

The sweep balance system SB*x* contains only a single measuring gauge G*x* which is compared with the standard or reference impedance 104 of the appertaining measuring circuit B*x* by means of a periodically variable rheostat R*x*. The single gauge G*x* may either be additional to those of the other sweep balance systems or it may consist of any one gauge selected from the other systems. For instance, in Fig. 4 a manually operable selector switch S*x* is shown which has two interconnected movable contacts 102 and 103 that can be set for substituting a gauge of group G1 for the gauge marked G. The impulse transmitter T*x* connected to the output diagonal of the measuring circuit issues oscillatory impulses of a distinctive frequency characteristic (*fx*) to the impulse storing recorder SR. The slider of rheostat R*x* is mounted on a common shaft 111 with the sliders of the other sweep balance systems. Consequently, a measurement of the quantity responded to by gauge G*x* is made and a corresponding impulse of the frequency (*fx*) issued during each cycle of operation of the rheostatic devices.

The system SB*x*' includes a gauge G*x*', a selector switch C*x*', and a measuring circuit B*x*' which contains a source of constant voltage 100. The circuit B*x*' is shown as being of the potentiometric type; that is, in this example the gauge G*x*' is assumed to be of the voltage generating type, and the voltage furnished thereby is periodically compared with that of the source 100 by means of the rheostat R*x*'. The output branch of this circuit is connected to an impulse transmitter T*x*' which issues impulses of distinctive frequency characteristic (*fx*'). The essential difference between the system SB*x*' and the other sweep balance systems of the apparatus lies in the fact that in the system SB*x*' the measuring cycles occur in intermittent intervals. To this end, the movable contact member 105 of the selector switch C*x*' cooperates with a limited number of bank contacts that are evenly distributed over the periphery of the switch so that the contact 105 connects the gauge G*x*' into the measuring circuit B*x*' only after the elapse of a given multiple number of cycle periods. For instance, while the selector switch C1 completes one full sequence of operation, only one, two or, as shown, three connections are made between the gauge G*x*' and the appertaining circuit B*x*'. As a result an impulse of the frequency *fx*' is issued only, for instance, each 10th or 12th sweep cycle of the rheostatic circuit control devices.

The common shaft 107 of the automatically operable selector switches is driven, through a reduction gear 108, from the shaft 109 of a constant speed motor M1 which also drives, through a gear or transmission 110, the shaft 111 of the rheostatic circuit control devices. The drive shaft 109 actuates also the impulse storing recorder SR through a gear 112.

The impulse transmitters of the apparatus are connected in parallel to the recording head 113 of the recorder SR so that the oscillatory impulses supplied from the transmitters are impressed on the magnetic tape 114 as it travels from the storage reel 115 to the take-up reel 116.

Connected to the recording head 113 is further a transmitter T*m* which serves to store a sound recording on the tape 114 and is connected to a microphone G*m*. This permits storing on the recorder tape, in addition to the measuring and reference impulses, any oral information that may be desirable in conjunction with the recorded measuring or test data. If the sound recording is to be used only before the beginning of the actual measuring series, the transmitter T*m* may issue a full band of frequencies as customary for sound recording. However, it is also possible to supply through the microphone G*m* a running information during the measuring periods proper. In order to permit such simultaneous recording of data and sound, the frequency bands of the measuring and reference impulses should be so chosen relative to the frequency band or bands transmitted by the transmitter T*m* that the sound recordings produced by transmitter T*m* do not disturb the proper performance of the reproducing devices when the recording tape is subsequently used for the production of diagram records; that is, the frequencies transmitted by the transmitter T*m* should not include those of the measuring-impulse and reference-impulse transmitters.

The magnetic recording tape 114 after being impressed with stored signals may correspond to the conditions schematically exemplified by the diagram of Fig. 5. The individual periods of the sweep cycle performed by the potentiometric circuit control devices correspond to equal amounts of travel and hence to equal distances along the magnetic tape 114 (Fig. 5). These intervals are identified by the regular recurrence of an impulse Io of the reference or zero frequency *f*0, these impulses being emitted by the transmitter T0 (Fig. 4). Consequently, the beginning of each cycle period is marked by an oscillatory impulse I0 (Fig. 5). Within each of these cycle periods, measuring signals are emitted from the transmitters T1, T2 and Tx at respective frequencies $f1$, $f2$ and $fx$. The corresponding oscillatory impulses are schematically represented in Fig. 5 at I1, I2 and Ix. The distance of each of these measuring impulses from the appertaining zero impulse I0 may be different in different cycles and reflects the variation of the respective quantities measured by the gauges. While measuring impulses of the same frequency $f1$ (or $f2$) occurring within successive cycle periods appertain of the same gauge group G1 (or G2), the measuring impulse impulse Ix, originating from the transmitter Tx, reoccurs within each cycle but refers always to a quantity measured by one and the same gauge Gx.

Still referring to Fig. 5 it will be noted that in cycle 1 a measuring impulse Ix' is also indicated. This impulse originates from the transmitter Tx' (Fig. 4). Corresponding impulses are absent in cycles 2, 3, 4, etc. If it is assumed that the sweep balance system SBx' is effective each 12th sweep cycle, then another impulse Ix' will occur in the cycle 12, as shown in Fig. 5.

A magnetic tape or other oscillatory record obtained with a system according to Fig. 4 can be used for reproduction purposes in an apparatus designed in accordance with the principles explained above with reference to Figure 2. For instance, if the apparatus according to Fig. 2 is used with a tape as obtained with an apparatus according to Fig. 4, only the impulses I0, I1 and I2 will pass through the discriminating filters of the reproducing apparatus while all other impulses are ineffective. Hence the apparatus can be used for producing diagram records showing quantity-versus-time curves of two or more measured quantities. As stated, however, a recording of stored impulses obtained in apparatus according to Fig. 4 can likewise be used for reproducing the measured values in the form of X—Y diagrams. A reproducing apparatus cable of such a performance is diagrammatically illustrated in Fig. 6.

The reproducing apparatus shown in Fig. 6 is in part similar to that of Fig. 2. That is, it has an oscillation recorder SR whose record carrier 114 (magnetic tape, previously impressed with oscillatory impulses) travels from the storage reel 115 onto the take-up reel 116 while passing along a reproducing head or pick-up 117 which is connected by filters F0, F1, F2 and F0' with two marking units of a diagram recorder DR substantially as described above, amplifying and rectifying devices being omitted in Fig. 6. As in the reproducing apparatus of Fig. 2, the carrier 114 of the stored impulses shown in Fig. 6 is driven by a shaft 122 and a transmission or gearing 123 from the drive shaft 124 of a motor M2 at substantially constant speed; and the drive shaft 124 is likewise geared, at 125, to the shaft 126 of the transparent drum 127 for the endless strip chart 128 of the diagram recorder DR. The drum 127 is electrically connected to a common output lead of the filters F0, F1 and F2, while the two stylus devices 129 and 130 are both connected to the filter F0 and separately connected to filters F1 and F2 respectively.

A filter Fm transmits the recorder sound to a phone or loud speaker Lm for reproduction of the oral information stored on the carrier 114 of the storing device SR.

In contrast to the apparatus of Fig. 2, the feed-screw 131 of the recorder styli is not driven from the constant speed shaft 124 but is operated by a reversible drive, here shown as a reversible motor M3, which positions the styli in dependence upon the variable quantity (X) represented by the impulse (Ix) issued from the filter Fx. More specifically, the motor M3 is caused by its control system MC to assume a position determined by the variable phase position, within each sweep cycle, of the measuring impulse Ix relative to the reference or zero impulse I0. While the motor control system MC is only schematically represented in Fig. 6, several modifications thereof are shown in detail in the following figures and will be described below.

Since in the diagram recorder DR (Fig. 6) the stylus position (abscissa) is a function of the X-quantity measured by the gauge Gx (Fig. 4) while the distance between zero marks and measuring marks along the advancing direction of the chart (ordinate) is a measure of the Y-quantities measured by other gauges, the curves marked on the chart are of the X—Y type. For instance, the curve D1 relative to the respective zero line z1 in Fig. 6 represents the quantity (Y) measured by one of gauges G1 (Fig. 4) versus the quantity (X) measured by gauge Gx, and curve D2 in Fig. 6 is similarly a function of the Y and X quantities measured by one gauge of the group connected to transmitter T2 and by gauge Gx respectively.

Apparatus for X—Y diagrams may be used in combination with apparatus of the type shown in Fig. 2 so that quantity-versus-time diagrams and X—Y diagrams are simultaneously produced from one and the same series of stored oscillatory impulses, and it is also possible to reproduce one and the same quantity versus time and also versus a measured quantity other than time.

Details of the motor control system MC (Fig. 6), will now be described with reference to the embodiment exemplified by Fig. 7. The filter Fx, the diagram recorder DR, and the impulse controlled motor M3 for positioning the stylus device 129 relative to the drum 127 and chart 128 are assumed to be identical in both figures.

Figure 7:
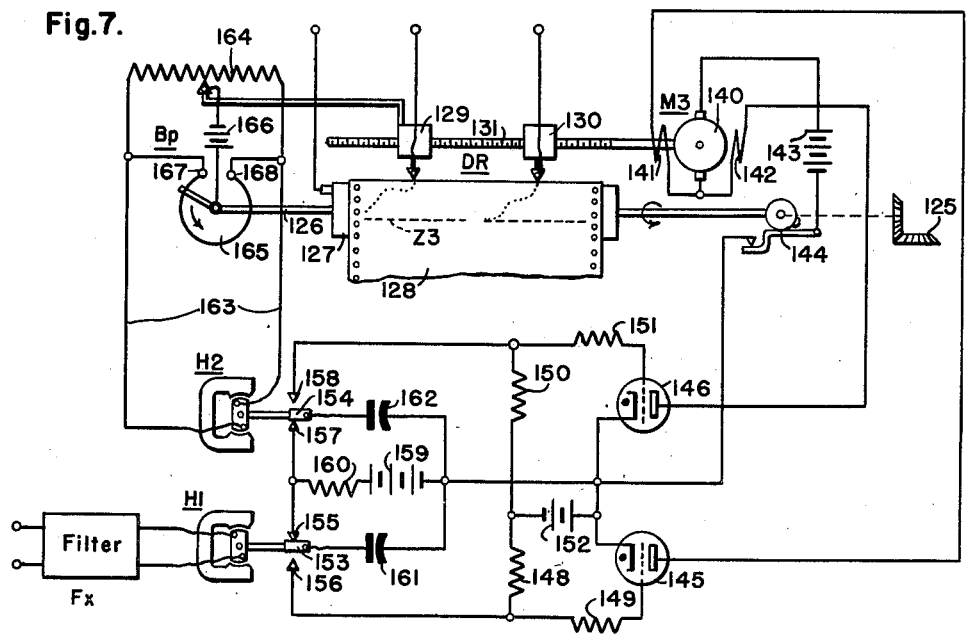
Fig. 7 shows details of the motor-control devices appertaining to the stylus positioning motor of the X—Y recording apparatus of Fig. 6.

According to Fig. 7, the motor M3 for operating the feed-screw 131 of the stylus devices is a reversible direct-current motor whose armature 140 cooperates with two field windings 141 and 142. These windings cause the motor to run in one or the other direction depending upon which winding is energized or more energized than the other. The motor is connected to a direct-current source 143 under control by a switch 144. The two circuit branches of the field windings 141 and 142 form the plate circuits of respective electronic trigger tubes 145 and 146.

The switch 144 has its contacts actuated by a cam mounted and angularly adjustable on the shaft 126 of the chart-transport drum 127. This switch remains closed during the major portion of the individual cycle periods of the reproduction series and is temporarily and very shortly opened immediately before the beginning of each cycle. The grid circuits of the tubes 145 and 146 include impedances 148, 149 and 150, 151 respectively and are normally biased by a voltage source 152 beyond cut-off so that the tubes have the tendency to maintain the motor windings 141 and 142 deenergized. Consequently, as long as no trigger effect is imposed on either grid circuit, the motor M3 will remain at rest.

In order to produce and control such a trigger effect, the grid circuits of the two tubes 145 and 146 are connected to two respective relays H1 and H2 consisting, in this example, of polarized moving-coil instruments whose movable contact 153 or 154 is engageable with two stationary contacts 155, 156 or 157, 158. A voltage source 159, in series with a resistor 160, is connected with contacts 155 and 157 so as to charge two capacitors 161 and 162 when the relays H1 and H2 are in the illustrated contact position. When relay H1 responds by shifting its movable contact 153 into engagement with contact 156, the capacitor 161 applies its discharge voltage to the grid circuit of tube 145. The polarity of this capacitor voltage is opposite to that of the grid bias voltage from source 152 and the discharge amplitude is sufficient to safely trigger the tube 145 which thereafter remains conductive and thus energizes the motor winding 141 until the switch 144 opens its contact. Similarly, when the relay H2 is caused to switch its contact 154, the discharge impulse from capacitor 162 will trigger the tube 146 and thereby energize the motor winding 142 until the switch 144 is opened. When only one tube is triggered at a time, the motor M3 will run in the direction determined by that tube. When both tubes are in triggered condition at the same time, both motor windings are energized and balanced so that the motor, if previously running, is rapidly braked and then held stopped in locked-rotor condition.

The relay H1 is normally biased to assume the illustrated contact position. It is connected to the filter Fx so that it receives a switching impulse at the moment a measuring signal of the frequency (fx) passes through the filter Fx. A rectifier may be used to secure the proper polarity of relay excitation.

The relay H2 has its coil connected in the output or zero diagonal 163 of a bridge circuit Bp which includes two adjustable impedance devices, both exemplified by rheostats 164 and 165 respectively. The bridge is energized by direct current from a source denoted by 166. The slide contact of rheostat 164 is mechanically connected to the stylus device 129, or to the appertaining feed shaft, so that the adjustment of rheostat 164 is indicative of the stylus position. The slide contact of rheostat 165 is driven from the drum shaft 126 so that it completes a full range of rheostat adjustment for each cycle period of a reproduction series. The slider of rheostat 165 is angularly adjusted relative to the drum shaft 126 so that the slider commences its travel at point 167 in the moment when the zero impulses are impressed on the stylus and the zero mark Z3, produced on the chart. It will be remembered that the synchronized switch 144 opens shortly before that moment, and it is preferable to adjust the switch 144 so that its opening occurs in the interval when the slider or rheostat 165 passes from the end point 168 to the starting point 167 of its travel.

The bridge circuit Bp is so polarized that the unbalance voltage effective across the relay diagonal at the beginning of slider travel biases the movable relay contact 154 toward the illustrated position. When during its travel the slider of rheostat 165 passes through the point of circuit balance, the voltage across the relay diagonal 163 passes through zero and thereafter increases in reversed polarity. At the reversing moment, therefore, the relay H2 switches over and trips the tube 146. The phase position of that moment relative to the cycle of impulse transmission is determined by the phase position of the point of travel at which the slider of rheostat 165 just balances the bridge circuit Bp, and this point is in turn determined by the slider position of rheostat 164 and hence by the relative position between stylus and chart.

Whenever during the operation of the apparatus the slider of rheostat 165 begins its travel at point 167, both relays remain, at first, in the illustrated positions so that both tubes 145, 146 are non-conductive and both motor windings 141 and 142 deenergized. If the stylus is in the position that corresponds accurately to the value of the X-quantity then measured, the relay H1 switches over at the same moment at which the filter Fx passes a switching impulse to the relay H2. Hence, both tubes are simultaneously tripped and both motor windings 141 and 142 become simultaneously energized and hold the motor M3 at rest so that the stylus position remains unchanged. After the end of the cycle and before a new cycle is started the switch 144 opens and resets the tube circuits for the next tripping performance.

If the stylus position is not in accordance with the X-quantity, then either relay will respond earlier than the other and one of the motor windings will be energized alone for a brief interval of time and thus impart a directionally controlled motion to the motor armature before the other winding becomes energized and stops the motion. The direction of this interval of individual excitation is substantially proportional to the difference between the measured and stored value of the X-quantity and the X-value then indicated by the stylus position, and the positioning direction of the motor is such as to reduce that difference. During successive cycle periods a quick succession of directionally and quantitatively controlled impulses or kicks is imparted to the motor armature. As a result the motor performs a follow-up motion determined by the phase variations of the X impulses relative to the period of the impulse cycles as explained previously with reference to Fig. 6.

Figure 8:
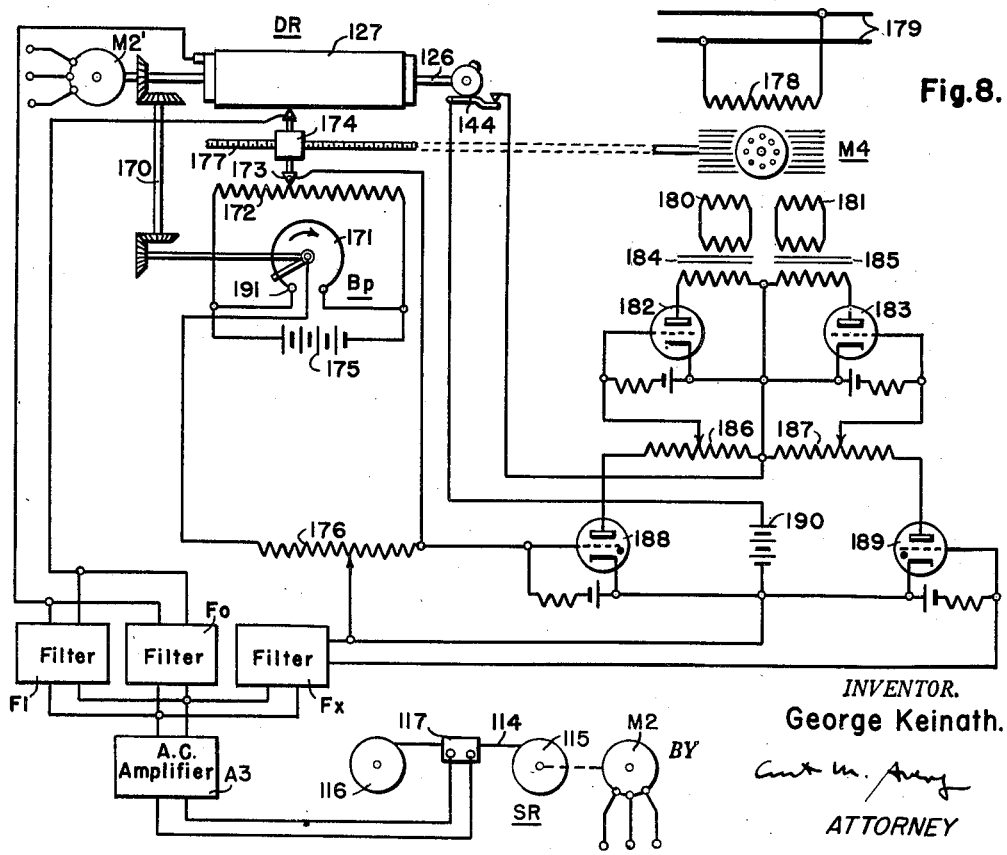
Figs. 8, 9 and 10 represent diagrammatically three respective other modifications of such positioning motor control devices.

The reproducing apparatus shown in Fig. 8 serves purposes similar to those of the apparatus according to Figs. 6 and 7 but is shown for operation of a single marking unit of the diagram recorder DR so that a smaller number of filters is required than in the above-described embodiment. Aside from such simplification of the marking control and filter circuits, the embodiment of Fig. 8 is mainly distinguished by a control circuit for the stylus-positioning drive that avoids the electromagnetic relays used in the control system of Fig. 7.

In Fig. 8 the impulse storing device SR has the carrier 114 of the stored signals driven by a motor M2, while a separate motor M2' is shown for driving the drum 127 of the diagram recorder DR. Both motors are to operate at constant correlated speeds and may be replaced by a single drive motor with a suitable connecting transmission. A transmission 170 serves to rotate the slide contact of the sweep rheostat 171 which, like rheostat 165 in Fig. 7, forms part of a bridge circuit Bp. Circuit Bp contains another rheostat 172 (Fig. 8) with a slider 173 mechanically connected to the stylus carrier 174 of the diagram recorder DR. The circuit Bp is energized by a direct current source 175 and contains a resistor 176 in its zero or output diagonal.

The stylus carrier 174 is positioned by means of a feed screw 177 driven by a motor M4 which, in this instance, is an alternating-current motor of the shaded pole type. Motor M4 has a main field winding 178 energized from an alternating current line 179. The magnetizable field structure of motor M4 has two shading coils 180 and 181 so arranged that respective secondary voltages are induced therein when the main field winding 178 is energized. With the two circuits of the shading coils open, the single-phase excited main winding 178 produces no starting torque so that the motor will remain at rest. When the circuits of both shading coils are closed, and assuming that both shading coils have then equal ampere turns, the motor will also remain at rest with the squirrel cage armature held in locked-rotor condition. However, when only one shading coil circuit is closed, or when both are closed with the ampere turns of one exceeding those of the other, the motor develops starting torque and runs in one or the other direction depending upon which shading coil exceeds in ampere turns.

The respective circuits of the shading coils 180 and 181 contain electronic tubes 182 and 183 that operate substantially as controllable impedances. The plate voltage for these tubes is supplied by the two shading coils 180 and 181. If desired, the shading coils 180 and 181 can be rated to provide a secondary voltage of sufficient magnitude to directly operate the tubes, and the tubes may then directly be connected to the shading coils. As a rule, however, the secondary voltage across commercially available motors of this type is lower than the plate voltage required for the commercially available and most economically applicable vacuum tubes. For that reason, the illustrated embodiment contains step-up transformers 184 and 195 between shading coils and tubes. The two tubes are matched and normally under a grid bias above cut-off or sufficiently negative to make both tubes highly impedant. Consequently, the circuits of the shading coils are virtually both open, or preferably, these circuits have equally high impedance so that both shading coils are weakly energized and hold the motor armature sufficiently locked to prevent undesired stylus movements.

In order to control the impedance tubes 182 and 183, their respective grid circuits are connected across a preferably adjustable portion of rheostats 186 and 187 respectively. These rheostats are arranged in the plate circuits of two respective trigger tubes 188 and 189, for instance, of the thyratron type. The trigger tubes are plate-energized from a direct-current source 190 through the synchronous switch 144 controlled by the shaft of the drum 127. When either trigger tube is tripped at any instant within the cycle period of the rheostat 171 in bridge Bp, the tube remains conductive until, at the end of that cycle, the switch 144 opens the plate circuit and then resets the tube for subsequent triggering. Both trigger tubes are normally grid-biased for cut-off.

The grid circuit of trigger tube 188 extends across an adjusted portion of the resistor 176 in the output diagonal of the bridge circuit Bp. When the slider of the sweep rheostat 171 starts a cycle of travel at point 191, the bridge is unbalanced and a corresponding unbalance voltage is effective across the resistor 176. The voltage drop then imposed by the tapped portion of resistor 176 on the grid circuit of tube 188 is of the same polarity as the normal cut-off grid bias. Hence, the tube 188 is non-conductive. At the moment when the slider of rheostat 171 passes through the point of balance adjustment, the voltage across the resistor 176 reverses its polarity and thereafter increases to a value sufficient to overcome the cut-off bias of tube 188 and to trip this tube. The angular adjustment of the slider of rheostat 171 and the adjustment of the tap-off point on resistor 176 are such that the phase position of the tripping movement relative to the period of the impulse cycles to be reproduced is indicative of the then obtaining position of the stylus relative to the chart or drum of the diagram recorder DR.

The grid circuit of the other trigger tube 189 is connected to the filter Fx, preferably through a rectifier (not shown). Filter Fx receives impulses from the storing device SR through an amplifier A3 to which are also attached the filters F0 and F1 for controlling the marking operation of recorder DR. Each time an impulse passes through filter Fx, the tube 189 is triggered and remains conductive until the cycle period is terminated by the opening of switch 144.

During the intervals in which the triggered tube 188 remains conductive, a voltage is impressed across the rheostat 186. The corresponding tapped-off voltage drop opposes and predominates over the normal grid bias of the impedance tube 182 and hence renders it conductive, or considerably decreases its impedance, in the circuit of the shading coil 180. Similarly, when tube 189 conducts, the voltage across the rheostat 187 causes the impedance tube 183 to conduct or to reduce its impedance in the circuit of the shading coil 181.

Consequently if tube 188 is triggered earlier than tube 189, the motor M4 will be caused to run one way, and when tube 189 trips first the motor will run the other way. Each driving impulse lasts only as long as the other tube does not trip. During a series of cycles a succession of directional kicks is thus imparted to the motor. The resulting follow-up performance is similar to that obtained in the apparatus of Fig. 7 so that the diagram marked on the chart is of the X—Y type.

Figure 9:
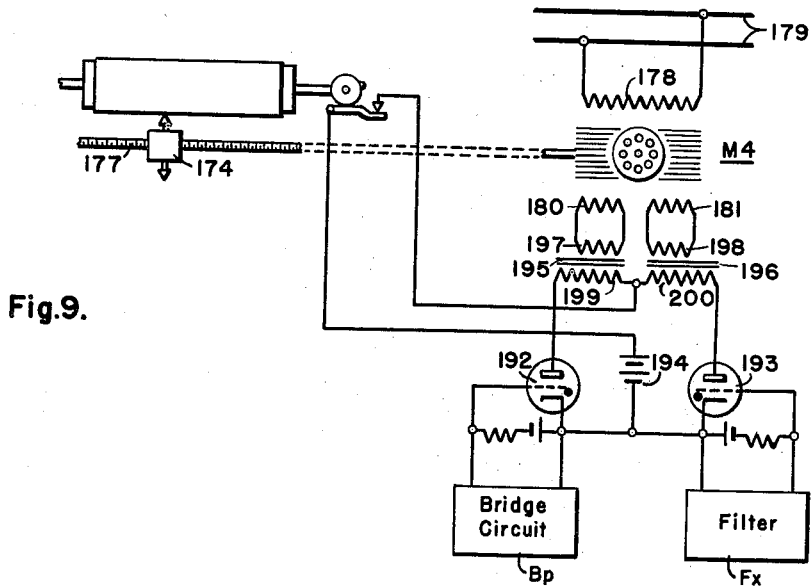

A modification of the X—Y recorder just described is shown in Fig. 9. In this figure, the bridge circuit Bp of Fig. 7 or 8 is denoted as a whole by the box device marked Bp. This circuit trips the trigger tube 192 as described above with reference to the tube 188 of Fig. 8, and the trigger tube 193 (Fig. 9) is tripped by impulses from the filter Fx as described relative to tube 189 in Fig. 8. The diagram recorder DR and the shaded pole type motor M4 shown in Fig. 9 are likewise similar to the corresponding elements of Fig. 8. The essential differences between the two embodiments concern the electric connections between the trigger tubes and the shading coils of the motor.

According to Fig. 9 two saturable reactors or transformers 195 and 196 are disposed between the shading coils 180, 181 and the anode circuits of tubes 192 and 193 respectively. The reactance coils 197 and 198 of the two reactors are connected across the respective shading coils and have a relatively high reactance value as long as the respective magnet cores of the reactors are magnetically unsaturated. When tube 192 is conductive, a direct-current passes through the coil 199 of reactor 195 from source 194. The resultant magnetization of the core in reactor 195 is then increased with the result of reducing the reactance of coil 197 in the circuit of the shading coil 180. Thus the ampere turns of shading coil 180 increase correspondingly. Conversely, when tube 193 is triggered, the reactor coil 200 increases the magnetization of the reactor 196 and causes an increase in the ampere turns of shading coil 181. Consequently, the motor M4 will run in one or the other direction depending upon which of the two controlling impulses comes first, until the positioning effected by the motor substantially eliminates the timely difference of the impulses.

Reviewing the embodiments of Figs. 7 to 9, it will be recognized that the directional control of the motor M3 or M4 depends upon the periodic reoccurrence of two impulses of which one ($Ix$) may be considered to represent a program that the motor or motor-positioned structure is to follow, while the other impulse, coming from the bridge circuit $Bp$, is indicative of the actually existing condition or position. Both impulses are compared as to their timely occurrence within a recurrent cycle period and the response of the motor is such as to minimize the time difference. Hence, the stylus adjusting portion of X—Y-diagram producing apparatus according to my invention represents as such a program controller, i. e. a device that compares an actual condition with a program condition and regulates the actual condition toward conformity with the program. As to this aspect, my invention is related to that of my copending application Serial No. 538,187 filed May 31, 1944, now Letters Patent No. 2,503,052 issued April 4, 1950, for Control and Recording Apparatus which, if desired, may be drawn upon for further information on suitable motor control circuits and with respect to which the control systems according to Figs. 7 to 9 of the present disclosure involve advantageous simplifications and improvements.

It will also be recognized that reproducing apparatus of the type described above with reference to Figs. 6 to 9 are essentially devices for translating two or more measuring results, each available as a quantity-versus-time function into an X—Y type diagram; and it should be understood that this translating principle of my invention is not limited to measuring results stored as oscillatory impulses but is generally applicable for translating into X—Y diagrams any forms of quantity-versus-time records that can be converted into timely successive series of impulses.

The measuring and storing apparatus of Fig. 4 is shown to include a sweep balance system $SBx'$ whose transmitter $Tx'$ issues its impulses only in spaced cycles, for instance, each twelfth successive sweep balance cycle as it is represented in the diagram of Fig. 5. The stored and reproduced impulses $Ix'$ of the frequency $fx'$ originating from such a system can be used for quantity-versus-time of X—Y recording substantially as described above, except that for X—Y recording the reproducing apparatus should contain a periodically operating switch, geared to the drive, which prevents the bridge circuit $Bp$ (see Figs. 7 to 9) from affecting the motor control system during the intermediate cycle periods in which no $Ix'$ signal is reproduced. However, a measuring and storing system of the type shown at $SBx'$ in Fig. 4 is especially suited for X—Y type reproducing apparatus that involve a "time transformer" principle as explained presently in conjunction with the embodiment of Fig. 10.

Figure 10:
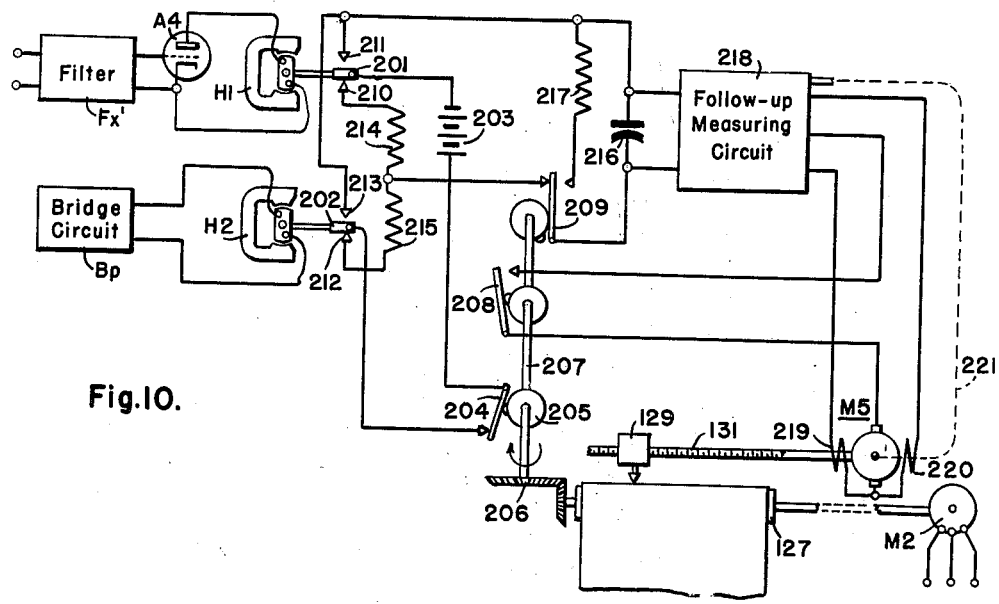

Fig. 10 illustrates substantially only the motor control section of the reproducing apparatus, it being assumed that the pick-up of the appertaining oscillation storing device (see SR in Figs. 6 and 8) is connected to a filter $Fx'$ for impulses $Ix'$ of the frequency $fx'$, instead of to the filter $Fx$ shown in Figs. 6 to 9. The impulses issuing from filter $Fx'$ in Fig. 10 each twelfth cycle period actuate a moving coil relay H1 through an amplifier A4 substantially in the manner explained above with reference to relay H1 in Fig. 7. The bridge circuit $Bp$, controlled in dependence upon the stylus position, is similar to those shown in Figs. 7 and 8 and operates a relay H2 (Fig. 10) in the manner explained above with reference to relay H2 of Fig. 7.

The movable contacts 201 and 202 of relays H1 and H2 respectively, in Fig. 10, are connected to the terminals of a direct-current source 203 in series with a switch 204 whose actuating cam 205 is driven from the drive motor M2 through a reducing transmission 206 so that the switch 204 is closed only during the active cycle periods of the relays H1 and H2 and open during the intermediate eleven periods. The shaft 207 of cam 205 carries the cams of two other switch contacts 208 and 209. Contact 209 is moved for a brief interval of time from the illustrated position shortly before the beginning of each active, twelfth cycle and remains positioned as illustrated during the rest of the twelfth-cycle series. Contact 208 opens shortly before the contact 209 switches from the illustrated position and remains thereafter open during the entire active, twelfth cycle period; but contact 208 is closed during the rest of the following sequence of eleven successive cycle periods.

The stationary contacts 210, 211 and 212, 213 of respective relays H1 and H2 are connected to two balanced resistors 214, 215 and to a capacitor 216 as shown. A discharge resistor 217 lies across capacitor 216 during the short interval of actuation of contact 209. As will be explained below, the capacitor is charged from source 203 under control by relays H1 and H2 so as to collect a charge whose polarity depends on which of the relays responds first and whose magnitude depends upon the time elapsing between the moments of response of the two relays. In order to measure the capacitive charge as to voltage polarity and magnitude, a measuring circuit device 218 of the self-balancing or follow-up type is connected to the capacitor 216. The stylus positioning motor M5 is mechanically connected by a suitable transmission 221 with the follow-up member of the circuit device 218. The two directional control field windings 219 and 220 are selectively controlled by the circuit device 218 and cause motor M5 to run at substantially constant speed in the direction and to the extent required to balance the circuit device 218 relative to the voltage across capacitor 216. Circuit device 218 may include an electronic voltmeter (not shown) to whose grid circuit the capacitor is connected and whose output voltage is balanced in a self-adjusted bridge or potentiometer circuit that is adjusted by the motor M5 under control by the unbalance voltage occurring in the output or zero branch of the circuit. However, since such and other voltage-measuring follow-up devices are well known per se and their particular details are not essential to my invention proper, such details are not illustrated.

Let us assume that an active, twelfth cycle has just started with the capacitor 216 discharged, switch contact 204 closed, contact 208 open, and contact 209 in the illustrated position. Then, if relay H1 responds to an $Ix'$ impulse before the relay H2 switches over, the relay contact 201 connects the source 203 across the capacitor 216 in the circuit 203—204—202—212—215—209—216—211—201—203. The capacitor 216 collects an increasing charge through the resistor 215 with a time constant of sufficient magnitude to maintain the charge substantially proportional to the charging time; that is, the rate of charge is such that an approximate proportionality of capacitor voltage to time exists for a maximum charging period at most equal to the period of one cycle of impulse transmission. At the moment when the relay H2 responds, the charging circuit is interrupted between contacts 202 and 212 so that the capacitive voltage then reached is a measure of the charging interval. If the relay H2 responds first, the capacitor 216 is charged in a similar way except that the polarity of connection of source 203 is reversed. At the end of the active cycle period, the voltage across capacitor 216 is thus indicative, by polarity and magnitude, of the direction and extent of motor travel necessary to properly position the stylus device 129. Immediately after the end of the active cycle period, the contact 208 closes and thereby permits the motor M5 to operate, while the contact 204 is kept open in order to prevent a premature recharging of capacitor 216. Now a total period of about eleven successive cycles is available for the motor M5 to complete the positioning motion. Near the end of that total period, the motor then being at rest again, the contact 209 switches over and discharges the capacitor 216 through the resistor 217 thereby resetting the system.

In the X—Y diagrams obtained with such a system, the Y values may be recorded during all successive cycles, while the X magnitude is measured and, if necessary, changed only after the elapse of a given multiple number of cycles. Hence, a system of this type is suitable especially in the case of slow changing X quantities as occurring, for instance, in temperature measurements.

The following quantitative values will further elucidate the invention.

Magnetic wire for storing and reproducing purposes according to my invention is now available for sound recording in a weight of 220 grams per 3500 meters length. A suitable speed for storing is about 300 cm. per second so that a wire of 3500 meters permits a continuous operation for a period of 11,600 seconds, i. e. more than 3 hours. When operating with five distinct frequency bands (f0, f1, f2, f3, f4) of which one serves for reference purposes, a total number of $$4 \times 11,600 + 46,400$$

individual measurements can be stored on the wire during that period. The actual operating time obtainable with a wire of the exemplified length of 3500 meters is in many cases much longer because the measuring periods are often intermittent. For instance, for long-time supervision purposes or tests the measuring and storing can be interrupted in regular intervals so that, for instance, one measuring and storing cycle occurs every half hour. In such a case, the reproduction may nevertheless be effected continuously and at high speed.

The frequency bands should be sufficiently distinct from one another and may therefore be placed beyond the audible range. Each individual impulse should comprise a sufficient number of wave cycles, for instance 5 to 10, to permit a safe filter performance. For instance, at a period of 300 multi-seconds for each sweep cycle, a ten-cycle impulse or wave train of the frequency 3000 C. P. S. has a duration of 3 milliseconds which is 1% of the total sweep period and amply sufficient for a safe and accurate performance.

The number of measuring points for each individual sweep balance system or for each gauge group (see G1 in Fig. 1, for instance) can be varied within wide limits depending upon the design and performance features of the selector switches (see C1 in Fig. 1). For example, a flight test recorder according to the invention may have 48 measuring points or groups for each sweep balance system. Hence a total of 144 magnitudes can be measured and stored with three systems each having a selector switch and a sweep rheostat with an impulse transmitter. With such a number of measuring points, a system according to the invention permits operating at a multiple of speed heretofore obtainable with multi-point measuring apparatus of a comparable number of measuring points.

Instead of operating the various sweep balance systems of a recording and storing apparatus simultaneously as described in the foregoing, it is also possible to operate these systems successively so that first one system completes a full series of sweep cycles and then remains at rest while the other systems successively perform their multi-point measuring operation; the measuring impulses may be stored on one or on several successively operating storing devices (SR). Such a modification permits reducing the number of amplifying circuits because the same amplifying means can be used successively for the different sweep balance systems, but it reduces of course the speed of succession of the measurements recorded from each individual gauge.

It will be understood from the foregoing that various modifications and alterations, other than those specifically described and shown, can be made by those skilled in the art without departing from the principles of my invention and within the scope of its essential features set forth in the claims annexed hereto.

What I claim is:

1. In combination, a plurality of gauges for varying an electric magnitude in response to respective quantities under observation, a plurality of impulse transmitters of respectively different impulse characteristics, circuit means disposed for connecting said gauges with said impulse transmitters and having relay means responsive to a given energizing condition and a circuit-control device for varying the energizing condition of said relay means over a range that includes said given condition, actuating means for periodically controlling said circuit-control device to cyclically vary said condition in order to cause said transmitters to periodically issue said impulses within the cycle periods at moments whose phase position relative to said periods is indicative of said respective quantities under observation, an impulse storing apparatus generally of the sound recording type which has a progressively movable record carrier and is connected to said transmitters so as to record said impulses of different characteristics on said carrier while said carrier is in motion.

2. In combination, a plurality of gauges for varying an electric magnitude in response to respective quantities under observation, a plurality of oscillatory impulse transmitters of respectively different frequencies, circuit means disposed for connecting said gauges with said impulse transmitters and having relay means responsive to a given energizing condition and a circuit-control device for varying the energizing condition of said relay means over a range that includes said given condition, actuating means periodically controlling said circuit-control device to cyclically vary said condition in order to cause said transmitters to periodically issue said impulses within the cycle periods at moments whose phase position relative to said periods is indicative of said respective quantities under observation, an impulse storing apparatus generally of the sound recording type which has a progressively movable carrier member and is connected to said transmitters so as to record said impulses of different frequencies on said carrier, microphone means and an electric filter connecting said microphone means with said storing apparatus for also recording sound on said carrier.

3. Apparatus for measuring and storing a multitude of measuring results, comprising in combination, a plurality of gauges for varying an electric magnitude in response to respective quantities under observation, a plurality of oscillatory impulse transmitters of respectively different impulse characteristics, circuit means disposed for connecting said gauges with said impulse transmitters and having relay means responsive to a given energizing condition and a circuit-control device for varying the energizing condition of said relay means over a range that includes said given condition, actuating means for periodically controlling said device to cyclically vary said condition in order to cause said transmitters to periodically issue said impulses within the cycle periods at moments whose phase position relative to said periods is indicative of said respective quantities under observation, an impulse storing apparatus generally of the sound recording type which has a progressively movable carrier member and is connected to said transmitters so as to record said impulses of different characteristics on said carrier while said carrier is in motion, and drive means connected with said storing apparatus and with said actuating means for operating both simultaneously and in a fixed time relation to each other.

4. Apparatus for measuring and storing a multitude of measuring results, comprising in combination, a plurality of gauges for varying an electric magnitude in response to respective quantities under observation, a plurality of oscillatory impulse transmitters of respectively different frequencies, circuit means disposed for connecting said gauges with said impulse transmitters and having relay means responsive to a given energizing condition and a circuit-control device for varying the energizing condition of said relay means over a range that includes said given condition, actuating means for periodically controlling said device to cyclically vary said condition in order to cause said transmitters to perodically issue said impulses within the cycle periods at moments whose phase position re'ative to said periods is indicative of said respective quantities under observation, impulse transmitting means synchronized with one of said circuit control devices for issuing a reference impulse each time said device passes through a reference position of a fixed phase relation relative to said cycle period, an impulse storing apparatus generally of the sound recording type which has a progressively movable carrier member and is connected to said transmitters and said transmitting means so as to record said impulses on said carrier, and drive means connected with said storing apparatus and with said actuating means for operating both simultaneously and in a fixed time relation to each other.

5. Apparatus for measuring and storing a multitude of measuring results, comprising a plurality of groups of gauges for varying electric magnitudes in response to quantities under observation respectively, a plurality of sweep balance systems each having a selector switch connected with the gauges of one of said respective groups and each having relay means responsive to a given relay-energizing condition and a circuit control device for varying the relay-energizing condition over a range that includes said given condition, a plurality of oscillatory impulse transmitters of different respective frequency characteristics connected to said respective relay means so that each transmitter issues an impulse at the moment when the appertaining relay means respond to said given energizing condition, an impulse storing device of the oscillation-recording type having a movable carrier and being controlled by said transmitters to store said impulses on said carrier, first transmission means interconnecting said selector switches, second transmission means interconnecting said circuit control devices, and drive means connected with said first and second transmission means and with said storing device for moving said switches and actuating said control devices in given time relation to the movement of the carrier, one of said transmissions including speed-change means so that each selector switch maintains one of the appertaining gauges connected to the appertaining relay during a full cycle period of the appertaining control device.

6. Apparatus for measuring and storing a multitude of measuring results, comprising a plurality of electric gauges responsive to respective quantities under observation, a plurality of oscillatory impulse transmitters of respectively different frequency characteristics, a plurality of sweep-balance circuit systems disposed for connecting said gauges with said respective transmitters and having each a relay means responsive to a given circuit condition and a circuit-control device for cyclically varying the circuit condition so as to pass during each cycle through a variable control phase in which said given condition occurs, an impulse storing device of the oscillation recording type for accommodating a movable carrier for the oscillatory impulses issuing from said transmitters, drive means for moving said carrier, actuating means under control by said drive means for actuating said circuit-control devices so that their cycle period has a given time relation to the travel of said carrier, and control means associated with said drive means and interconnecting said sweep-balance circuit systems so that an impulse is issued by the transmitter of one of said systems during the recurrence of a given multiple number of individual cycles of another one of said systems.

7. Apparatus for measuring and storing a multitude of measuring results, comprising a plurality of electric gauges responsive to respective quantities under observation, a plurality of oscillatory impulse transmitters of respectively different frequency characteristics, a plurality of sweep-balance circuit systems disposed for connecting said gauges with said respective transmitters and having each a relay means responsive to a given circuit condition and a circuit-control device for cyclically varying the circuit condition so as to pass durng each cycle through a variable control phase in which said given condition occurs, an impulse storing device of the oscillation recording type for accommodating a movable carrier for the oscillatory impulses issuing from said transmitters, drive means for moving said carrier at substantially constant speed, means for actuating said circuit-control devices so that their cycle period has a given time relation to the travel of said carrier, and control means interconnecting said sweep-balance system so that an impulse is issued by the transmitter of one of said systems only during intermittently recurring cycles so that said latter transmitter is ineffective during a given multiple number of cycles of another one of said systems, and transmitting means controlled by said actuating means and connected to said storing device so as to issue thereto a reference impulse each time the circuit-control device of said latter system passes through a fixed phase condition so that evenly spaced reference impulses are stored on said carrier together with the aforesaid impulses.

8. Apparatus for measuring and storing a multitude of measuring results, comprising a plurality of condition-responsive electric gauges, electric circuit means having impulse transmitters of different respective frequencies and cyclically operating control means for causing said transmitters to issue impulses whose phase position relative to the cycle periods is indicative of the respective conditions responded to by said gauges, another impulse transmitter under control by said cyclically operating control means so as to issue an oscillatory reference impulse of a fixed phase relation to said cycle periods, an oscillation-recording storing device having means for accommodating a movable carrier and being controlled by said transmitters for recording said impulses on the carrier, microphone means, electric filter means connecting said microphone means with said storing apparatus and being impervious to the frequencies of said impulses; whereby said carrier when in motion is impressed by regularly recurring reference impulses, by irregularly distributed impulses whose spacing from said reference impulses is indicative of the conditions responded to by said gauges, and by sound recordings.

9. Apparatus for reproducing in diagram form a plurality of data from oscillatory impulses of different frequency characteristics stored on an oscillation recording carrier, comprising a device disposed for accommodating and moving the carrier and having pick-up means responsive to the stored impulses; a plurality of discriminatory electric filters connected to said pick-up means for separating said impulses according to their differences in frequency characteristic; diagram recording means having chart accommodating means, a plurality of stylus means capable of relative movements in two coordinate directions relative to the chart, and drive means for controlling said relative movements; said stylus means being connected to said respective filters so that their marking operation is controlled by impulses of respectively different frequencies.

10. Apparatus for reproducing in diagram form a plurality of data from oscillatory impulses of different frequency characteristics stored on an oscillation recording carrier, comprising a device disposed for accommodating the carrier and having pick-up means responsive to the stored oscillatory impulses; a plurality of discriminatory electric filters connected to said pick-up means for separating said impulses according to their differences in frequency characteristic; diagram recording means having chart accommodating means, a plurality of stylus means capable of relative movements in two coordinate directions relative to the chart, and drive means connected to said device for moving said carrier at substantially constant speed and connected to said diagram recording means for controlling said relative movements in said two coordinate directions so that the latter movements are simultaneous and in a given speed relation to the carrier movement; said stylus means being connected to said respective filters so that their marking operation is controlled by impulses of respectively different frequencies while said drive means is in operation.

11. Apparatus for reproducing in diagram form a plurality of data from oscillatory impulses of different frequency characteristics stored on an oscillation recording carrier, comprising a device disposed for accommodating and moving the carrier, a plurality of discriminatory electric filters connected to said pick-up means for separating said impulses according to their differences in frequency characteristics; a diagram recorder having means for accommodating a chart and stylus means for marking the chart, said stylus means and the accommodated chart being capable of motions relative to each other in two coordinate directions, drive means connected with said device for moving the carrier; drive means connected with said diagram recorder for imparting said relative motion in one of said coordinate directions in a given speed relation to the carrier motion; positioning means mechanically connected with said recorder for imparting said motion in said other coordinate direction, said positioning means being electrically connected to one of said filters so as to be controlled in dependence upon the impulses of the one frequency characteristic transmitted through said latter filter; and said stylus means being connected to another one of said filters so that the marking operation is controlled by impulses of another frequency characteristic.

12. Apparatus for recording coordinate diagrams from oscillatory recordings, comprising a device for accommodating and uniformly moving a carrier impressed by recurrent and evenly spaced reference impulses and a plurality of recurrent measuring impulses of different respective frequency characteristics whose spacing from said respective reference impulses is in accordance with respective measuring quantities, said device having pick-up means responsive to said impulses; electric discriminatory filter means connected to said pick-up means for separating said impulses according to their differences in frequency characteristics; a diagram recorder having means for accommodating a chart and stylus means for marking the chart, said stylus means and the accommodated chart being capable of motions relative to each other in two coordinate directions, drive means connected with said diagram recorder for imparting said relative motion in one of said coordinate directions in a given speed relation to the carrier motion; positioning means mechanically connected with said recorder for imparting said motion in said other coordinate direction, said positioning means being electrically connected to said filter means so as to be controlled in accordance with the spacing of said reference impulses from the measuring impulses of one of said frequency characteristics; and said stylus means being connected to said filter means so as to mark the chart under control by the reference impulses and by measuring impulses of another frequency characteristic so as to produce a diagram comprising a line of reference marks and a curve representing a function of the two quantities corresponding to said latter two measuring impulses.

13. Apparatus for recording coordinate diagrams from oscillatory recordings, comprising a device for accommodating and uniformly moving a carrier impressed by recurrent and evenly spaced reference impulses and a plurality of recurrent measuring impulses of different respective frequency characteristics whose spacing from said respective reference impulses is in accordance with respective measuring quantities, said device having pick-up means responsive to said impulses; electric discriminatory filter means connected to said pick-up means for separating said impulses according to their differences in frequency characteristics; a diagram recorder having means for accommodating a chart and stylus means for marking the chart, said stylus means and the accommodated chart being capable of motions relative to each other in two coordinate directions, said positioning means being reversible and including a follow-up control system connected to said filter means so as to be controlled in dependence upon the spacing of one of said recurring measuring impulses from the recurring reference impulses in order to perform a follow-up adjustment when said spacing varies.

14. Apparatus for recording coordinate diagrams from oscillatory recordings, comprising a device for accommodating and uniformly moving a carrier impressed by sound recordings and by recordings of recurrent impulses of different respective frequencies substantially not within the frequency range of the recorded sound, said device having pick-up means responsive to said recordings; a plurality of discriminatory electric filters connected to said pick-up means for separating said recordings, sound reproducing means connected to the filter pervious to said sound recordings, and diagram recording means connected to said other filters for producing diagram records under control by said impulses of different frequency respectively.

15. In combination, cyclically operating impulse transmitting means for issuing electric control impulses of variable phase position relative to the cycle period, exhibiting means having a movable exhibiting structure, reversible drive means disposed for positioning said structure in opposite directions respectively and having two windings for controlling said directions respectively, a balanceable electric circuit having an output branch provided with balance-responsive first relay means and two variable impedance devices of which one is mechanically controlled by said drive means so as to assume an impedance adjustment in accordance with the position of the structure, control means connected with said other impedance device for periodically varying its impedance over a given range during said respective cycle periods whereby said first relay means are caused to respond during each cycle period at a moment whose phase position relative to said period is indicative of the position of said structure, second relay means connected with said impulse transmitting means for responding to said control impulses, electric circuit means for energizing said two windings disposed between said windings and said two relay means so that the directional control of said drive means depends upon whether and which of said two relay means responds earlier than the other during a cycle period.

16. In combination, cyclically operating transmitting means for transmitting two electric control impulses within recurrent cycle periods, exhibiting means having a movable exhibiting structure, reversible drive means disposed for imparting positioning movement to said structure and having two windings for controlling said movement in opposing directions respectively, two trigger relay means connected with said transmitting means so as to be triggered in response to the occurrence of said impulses respectively, two circuits connecting said two relay means with said respective windings so as to render said windings effective for movement in said respective directions when said relay means are triggered, and synchronous circuit control means associated with said two circuits to render them inoperative at the end of each cycle period to then reset said two relay means into triggerable condition; whereby during a cycle period, if said two impulses occur successively, first one winding and thereafter both windings are effective and control the drive means to position said structure in a direction depending upon which of said two impulses occurs first.

17. In combination, cyclically operating transmitting means for transmitting two electric control impulses within recurrent cycle periods, exhibiting means having a movable structure, a reversible electric drive disposed for imparting positioning movement to said structure and having two windings for controlling said movement in opposing directions respectively, two electronic trigger tubes having respective grid circuits controlled by said transmitting means so as to be triggered in response to the occurrence of said impulses respectively, two plate circuits associated with said respective tubes and connected with said respective windings in order to control said windings for movement of said drive in said respective directions when said respective tubes are triggered, and synchronous switch means associated with said two plate circuits to deenergize them at the end of each cycle period, whereby during a cycle period, if said two impulses occur successively, first one winding and thereafter both windings are effective and control the drive means to position said structure in a direction depending upon which of said two impulses occurs first.

18. In combination, cyclically operating transmitting means for transmitting two electric control impulses within recurrent cycle periods, exhibiting means having a movable structure, a reversible alternating current motor of the shaded-pole type disposed for imparting positioning movement to said structure and having two shading windings for controlling said movement in opposite directions respectively, two electronic trigger tubes having respective grid circuits controlled by said transmitting means so as to be triggered in response to the occurrence of said impulses respectively, and having two plate circuits connected with said shading windings respectively, and synchronous switch means associated with said two plate circuits to deenergize them at the end of each cycle period whereby during a cycle period, if said two impulses occur successively, first one winding and thereafter both windings are effective and control the motor to position said structure in a direction depending upon which of said two impulses occurs first.

GEORGE KEINATH.

REFERENCES CITED

The following references are of record in the file of this patent:

UNITED STATES PATENTS

| Number | Name | Date |
| --- | --- | --- |
| 1,910,254 | Keller | May 23, 1933 |
| 1,994,232 | Schuck, Jr. | Mar. 12, 1935 |
| 2,092,442 | Colwell | Sept. 7, 1937 |
| 2,279,018 | Wolfe | Apr. 7, 1942 |
| 2,338,991 | Arnold | Jan. 11, 1944 |